United States Patent
Hakbijl et al.

(10) Patent No.: US 8,516,839 B2
(45) Date of Patent: Aug. 27, 2013

(54) COMBINED HEAT EXCHANGE UNIT

(75) Inventors: Mark Hakbijl, Zwolle (NL); Anton Bonte, Amersfoort (NL); Fred Van Heeswijk, Amersfoort (NL)

(73) Assignee: Oxycom Beheer B.V., Raalte (NL)

( * ) Notice: Subject to any disclaimer, the term of this patent is extended or adjusted under 35 U.S.C. 154(b) by 616 days.

(21) Appl. No.: 12/794,796

(22) Filed: Jun. 7, 2010

(65) Prior Publication Data

US 2011/0079024 A1 Apr. 7, 2011

Related U.S. Application Data

(63) Continuation of application No. PCT/EP2008/066903, filed on Dec. 5, 2008.

(30) Foreign Application Priority Data

Dec. 5, 2007 (GB) .................................. 0723844.7

(51) Int. Cl.
*F25D 3/00* (2006.01)
*F28D 5/00* (2006.01)

(52) U.S. Cl.
USPC .............................................. 62/171; 62/304

(58) Field of Classification Search
USPC ............... 62/171, 310, 304, 314, 56, 160, 91, 62/95; 165/60, 166
See application file for complete search history.

(56) References Cited

U.S. PATENT DOCUMENTS

| | | | | |
|---|---|---|---|---|
| 4,380,910 A * | 4/1983 | Hood et al. | | 62/91 |
| 4,771,611 A * | 9/1988 | McNab | | 62/311 |
| 6,050,100 A * | 4/2000 | Belding et al. | | 62/271 |
| 6,434,963 B1 * | 8/2002 | Urch | | 62/279 |
| 7,093,452 B2 * | 8/2006 | Chee et al. | | 62/175 |

* cited by examiner

*Primary Examiner* — Chen Wen Jiang
(74) *Attorney, Agent, or Firm* — Hoyng Monegier LLP; Coraline J. Haitjema; David P. Owen (57) ABSTRACT

A heat exchange system for supplying air to a habitable space at a desired output condition includes a continuously variable mechanical cooler, an indirect evaporative cooler, an adiabatic cooler and a controller arranged to selectively supplement a cooling capacity of the indirect evaporative cooler, with a variable amount of cooling from the mechanical cooler in order to reach the desired output condition.

20 Claims, 7 Drawing Sheets

COMBINED HEAT EXCHANGE UNIT

CROSS REFERENCE TO RELATED APPLICATIONS

This application claims priority from United Kingdom application number 0723844.7 filed on Dec. 5, 2007, and is based on international application no. PCT/EP2008/066903 which was filed on Dec. 5, 2008 and which published under PCT Article 21(2) in English on Jun. 11, 2009, the contents of which applications are hereby incorporated by reference in their entirety.

BACKGROUND OF THE INVENTION

1. Field of the Invention

The invention relates generally to heat exchange devices and more particularly to devices for cooling a habitable space using a combination of cooling principles. The invention further relates to methods of controlling such devices to operate together to achieve a desired effect.

2. Description of the Related Art

Heat exchangers of some form or another are to be found in almost every process. In general, processes produce heat and that heat must be removed in order for equilibrium to be maintained. In many processes, heat will be transferred away passively by a number of mechanisms, including conduction, convection, evaporation and radiation. In other situations, such natural processes are insufficient and specific cooling processes must be implemented to remove the undesired heat.

A widely used and well understood process for cooling is the refrigeration cycle in which a fluid is pumped between a heat source and a heat sink. At the heat source, the fluid in liquid form adsorbs heat and is caused to evaporate. By compressing the fluid between the heat source and the heat sink the temperature of the boiling point of the fluid is adjusted. The gaseous fluid is then passed to a condenser at the heat sink where heat is subsequently given off on condensation. In this manner it can be achieved that the heat transfer to the fluid at the evaporator takes place at a lower temperature than heat transfer away from the fluid at the condenser.

Although such systems provide effective cooling, considerable energy is required to compress the fluid. Refrigerators and domestic air conditioning systems are in widespread use worldwide and their ever increasing consumption is a cause for great concern. Efficiency can be improved by the use of better working fluids and more efficient compressors. The usual manner of comparing efficiency is in terms of the coefficient of performance COP. This is generally calculated as the ratio of the rate of energy removed from the heat source to the power input to the system (usually the electrical power supplied to the compressor). The COP is strongly dependent on the temperatures at the source and sink and is difficult to compare overall. It typically has a value of between 2.8 and 3.2.

Another form of cooling system that is used in certain situations is based on the principle of evaporative cooling. Unsaturated air having a relative humidity below 100% has a propensity to adsorb further water by evaporation. The latent heat required to evaporate the water causes cooling of the air, as its enthalpy remains substantially constant. This principle of direct evaporative cooling has been known for many centuries. For example, a damp cloth placed over an object will keep the object cool by evaporation of liquid from the cloth. By continuously adding liquid to the cloth, the cooling effect may be maintained indefinitely without input of electrical energy. For air that is cooled by direct evaporation its absolute humidity increases due to the uptake of moisture. Its relative humidity also increases due to its lowered temperature until it is full saturated with water vapour. The lowest temperature that can be reached by evaporation of moisture in this way into an air stream defines the wet-bulb temperature for that air. Direct evaporative coolers are also sometimes referred to as adiabatic coolers, since the air is cooled at constant enthalpy.

An indirect evaporative cooler exploits the same principle of evaporative cooling to achieve an improved cooling effect. A primary or product air stream passing over a primary surface of a heat exchange element may be cooled by a secondary or working air stream passing over and absorbing moisture from a secondary wetted surface of the heat exchanger. Because the air is cooled without direct evaporation, its absolute humidity remains the same. As its temperature decreases only the relative humidity increases. Cooling to below the wet bulb temperature may be achieved in this manner although the actual temperature reached will depend on the wet bulb temperature of the working air stream.

Ideally, cooling of the air to the so-called dew point is desirable. The dew point is lower than the wet bulb temperature and is defined as the temperature to which a body of air must be cooled to reach saturation or 100% relative humidity. At this point, water vapour in the air condenses. Attempts have been made to improve on the principle of indirect evaporative cooling to approach the dew point by cooling or drying the working air stream prior to evaporation taking place. A particularly convenient way of cooling the working air stream is to feedback a portion of the cooled product air. Such devices are often referred to as dew point coolers as they may lower the temperature of the product air to below its wet bulb temperature and close to the dew point. By optimising the surfaces with which the air streams exchange heat, highly effective heat transfer can be achieved. This has been found especially significant in the case of the heat transfer from the wetted secondary surface. In order to provide moisture to the working air stream, the wetted secondary surface may be provided with some form of liquid supply e.g. in the form of a hydrophilic layer. The presence of such a layer can however result in increased thermal isolation of the secondary surface from the working air stream, thus reducing heat transfer.

A particularly efficient form of dew point cooler is known from PCT publication WO03/091633, the contents of which are hereby incorporated by reference in their entirety. While not wishing to be bound by theory, it is believed that the success of this device is due at least in part to the presence of heat transfer elements on the primary and secondary surfaces. These heat transfer elements may be in the form of fins and are believed to improve transmission of heat from the primary surface to the secondary surface. The fins act both to directly conduct heat and also to break up the various boundary layers that develop in the flow. They also serve to increase the total area available for heat exchange on the relevant surfaces. Further important features of the wetted second surface are known from that document and also from PCT Publication WO2005/040693, the contents of which are also incorporated by reference in their entirety. Accordingly, by careful choice of the material used as a water retaining layer, optimal evaporation may be achieved without thermal isolation of the secondary surface from the working air stream.

Such devices are extremely convenient for cooling, as they are simple to produce and install and require no refrigerant or compressor. Air may be circulated through the cooler using a low-pressure fan which has low energy consumption and is relatively silent. This makes the dew point cooler ideal for domestic use, especially at night. They are also easily adaptable for heat recovery and ventilation. Such devices may also be defined by values for COP based on the cooling produced and the power input to the fan. Nevertheless, this actual performance is strongly dependent upon the atmospheric conditions and may vary from 60 for hot dry external air to 30 in cases of high humidity where the capacity for further evaporation is small.

Attempts have been made in the past to achieve all-round performance by combining the principles of evaporative cooling with conventional air conditioners. An air conditioning unit comprising an air to air heat exchanger in combination with a vapour-compression type cooling circuit is known from U.S. Pat. No. 7,093,452. A control system controls the device to operate with only the air to air heat exchanger when a room temperature is below a pre-determined level. If the temperature rises, both systems are operated together.

Another device is known from U.S. Pat. No. 5,970,723 in which a conventional air conditioner and a direct evaporative cooler are combined. The device is arranged to switch backwards and forwards between the two systems by movement of a damper element. Control is based on a number of possible inputs including external temperature and humidity and user defined values.

Although various such combinations have been proposed, none of the known devices is able to maximize the efficiency of operation under all conditions of temperature and humidity. Furthermore, the known systems have not been shown to adequately provide air at a predetermined and consistent supply condition, as is increasingly required by building designers.

BRIEF SUMMARY OF THE INVENTION

According to the present invention there is provided a heat exchange system for supplying air to a habitable space at a desired output condition comprising a continuously variable mechanical cooler, an indirect evaporative cooler, an adiabatic cooler and a controller arranged to selectively supplement a cooling capacity of at least the indirect evaporative cooler, with a variable amount of cooling from the mechanical cooler in order to reach the desired output condition. The term "indirect evaporative cooler" or "evaporative cooler" is intended to refer to a device having at least primary and secondary channels in heat conducting relation with one another, whereby an evaporative liquid can be introduced into the secondary flow where it evaporates causing heat transfer from the air passing through the primary channels. The term "adiabatic cooler" is intended to refer to a device which cools the air by direct addition of water vapour such that the resulting enthalpy of the mixture remains substantially constant. In the present context, the term "mechanical cooler" is intended to refer to devices in which a working fluid circulating in a closed system extracts heat or reduces the enthalpy of the air by heat transfer therefrom. Reference to the mechanical cooler being "continuously variable" is intended to mean that it has the capability of supplying a variable output power in response to a variable input power and that the variation is generally continuous over its operating range. The term is intended to include both smooth variation and stepped variation, subject to its ability to deliver at least 10 different step values over the operating range. It will be understood as advantageous that the evaporative and adiabatic coolers are also continuously variable, allowing greater flexibility of operation in achieving the desired output condition.

Such a system is advantageously able to attain a predetermined output condition of the air starting from air in a wide range of initial conditions. The ability to achieve such a set point starting from a variety of initial conditions is typically the realm of mechanical coolers. These however require large amounts of power to achieve their cooling capabilities. The present invention advantageously avoids as far as possible the use of poor efficiency mechanical cooling by maximizing the use of an indirect evaporative cooler to perform a part of the cooling. The output of the indirect evaporative cooler is controllably supplemented with additional cooling from the continuously variable mechanical cooler which may reduce the output air temperature to below that obtainable by the indirect evaporative cooler alone. Thus a desired set point is achievable from a wide range of starting points but in a more energy efficient manner than was previously possible.

A preferred example of a continuously variable mechanical cooler is an advanced direct expansion cooling unit. In the present context, the term "advanced direct expansion cooling unit" is intended to refer to devices that are able to operate between different operating temperatures by variation of compressor and expansion valve settings. In order to achieve full control over a sufficiently wide range of values, a number of compressors may be connected e.g. in series, whereby at least one of the compressors should be variable.

A preferred embodiment of an indirect evaporative cooler comprises heat conducting projections extending into the primary and secondary channels. The heat conducting projections serve to break up boundary layers in the flow and also enlarge the surface area for heat conduction from the channels to the air circulating there through. Most preferably, the projections are also provided with a water retaining layer, at least within the secondary channels in order to encourage the take-up of moisture. The heat conducting projections in the primary channel are most preferably in direct heat conducting relation with the heat conducting projections in the secondary channel e.g. by being unitary therewith.

In a particularly preferred embodiment the cooling is effected by first cooling the incoming airstream with the indirect evaporative cooler, followed by mechanical cooling by the mechanical cooler and thereafter by adiabatic cooling to the desired set point. These devices are preferably located one after the other in series. Although many other configurations of devices are possible, such a series arrangement has been found to be advantageous in providing good temperature reduction, power output and overall COP over the operating ranges frequently encountered for air handling units.

In an alternative embodiment, the coolers are provided in series in a downstream order of indirect evaporative cooler, adiabatic cooler and then mechanical cooler.

In order to effectively control operation, in a preferred embodiment, the system comprises a sensor adapted to be responsive to input air conditions to provide an input condition signal to the controller. These input air conditions should preferably be sufficient to localize the condition of the air in an enthalpy diagram and may include temperature, absolute humidity, relative humidity and enthalpy. Based on a precise determination of the input condition of the air, the most efficient control of the system may be determined.

The system may preferably comprise further sensors including e.g. an intermediate sensor arrangement for determining at least the temperature of the air at an outlet from the indirect evaporative cooler. If the initial condition of the air at input to the primary channels of the evaporative cooler has already been determined, temperature measurement on output from the primary channels will generally be sufficient to determine its condition, since the absolute humidity will generally remain constant. The temperature reduction at exit from the primary channel of the evaporative cooler can indicate the effectiveness of its operation and can be used to determine the remaining input required from either the adiabatic cooler or the mechanical cooler. In the case of condensation in the primary channel, the absolute humidity may be estimated based on the measured temperature and the assumption that the relative humidity is approximately 100%.

In one preferred embodiment, the control unit comprises a memory including data defining operating ranges of the coolers and the controller is adapted to determine a region of operation on the basis of the input condition signal and control the operation of the coolers according to the region of operation. Within each of the different regions, different rules may be applied to determine the individual contributions of the different cooling systems. Preferably, three regions or zones are defined as described in further detail below.

The control unit comprises information regarding the three zones of operation and is responsive to the input condition signal to operate only the adiabatic cooling unit if the input condition signal is within a first zone, operate the evaporative cooling unit and at least the adiabatic cooling unit if the input signal is in a second zone and operate the evaporative cooling unit and at least the direct expansion cooling unit if the input signal is in the third zone. Most preferably, the temperature of the air at the outlet from the primary channel of the evaporative cooler is measured and the system selects the adiabatic cooling unit if the inlet air is in a second zone and selects the direct expansion cooling unit if the inlet air is in the third zone, in response to the temperature of the air at the outlet from the indirect evaporative cooler. In certain circumstances, all three devices will be operational when the input condition signal in the second zone and the ranges of operation of the adiabatic cooling unit and the indirect evaporative unit are insufficient to achieve the desired output condition.

In a particularly desirable configuration of the invention, the desired output condition comprises a predetermined output set-point of temperature and humidity for the air leaving the device. Many prior art air-handling units operate based on thermostatic settings for the temperature of a habitable space. Such sensing generally fails to take into account the humidity of the air which is significant in defining a comfort level. Furthermore, significant time lag may result due to the heat capacity of the habitable space. Alternatively, the system may operate to a set-point of cooling power. In this manner, an increase in temperature of the delivered air may be compensated by an increase in the volume of such air delivered.

In a preferred embodiment of the invention, the system further comprises a return air channel for supplying air from the habitable space to the secondary channel of the indirect evaporative cooler. Various possibilities are available for feeding air to the secondary channel. In particular, all of the return air may be supplied or alternatively a bypass may be provided for at least partially bypassing the secondary channel.

In an alternative embodiment the indirect evaporative cooler may be arranged as a dewpoint cooler, wherein a portion of the airstream exiting the primary channel of the evaporative cooler is reversed into the secondary channel, either before or after passing through the mechanical cooler and or the adiabatic cooler. Such a dewpoint cooler may be of the type described in WO03/091633 or WO2005/040693, the contents of which are hereby incorporated by reference in their entirety. A yet further preferred configuration is that described in WO2007/071796, the content of which is also herein incorporated by reference in its entirety. The controller may determine whether the indirect evaporative cooler needs to be operated based on return air from the habitable space or as a dewpoint cooler, depending on the return air condition.

In further preferred embodiments, the system also comprises a secondary sensor arrangement for determining a condition of an air supply to the secondary channel of the indirect evaporative cooler. Such a sensor arrangement also preferably registers air conditions sufficient to localize the condition of the air in an enthalpy diagram and may thus include temperature, absolute humidity, relative humidity and enthalpy. Knowing the condition of the air at entry to the secondary channel and its wet-bulb temperature will provide information regarding the expected temperature at the outlet from the primary channel. This can be used to determine the extent to which use of the evaporative cooler is desirable. If the temperature at inlet to the primary channel is only marginally different from the calculated wet-bulb temperature, it may be deemed more efficient to bypass the evaporative cooler completely and benefit from a reduced pressure drop through the system.

In a yet further preferred embodiment, the controller compares a value from the secondary sensor arrangement with a value from the inlet sensor arrangement and operates a bypass of the indirect evaporative cooler in the case that the difference is less than a preset amount.

The invention also relates to a method of operating a cooling system to supply air from an external source to a habitable space at a preset condition, the system comprising a controller for controlling operation of the system, a continuously variable mechanical cooler operable to selectively provide variable amounts of cooling output, an adiabatic cooler and an indirect evaporative cooler, the method comprising: determining operating ranges of the coolers; determining an inlet condition of the air from the external source; optionally operating the adiabatic or indirect evaporative cooler to cool the air if the inlet condition lies within the operating range of the adiabatic cooler or indirect evaporative cooler; effecting a variable amount of cooling output from the mechanical cooler to complement the cooling of the adiabatic cooler or evaporative cooler; and supplying the air to the habitable space at the preset condition.

Preferably, the controller comprises a memory including data defining regions of the operating ranges of the coolers and the controller determines a region of operation on the basis of the input condition signal and controls the operation of the coolers according to the region of operation.

BRIEF DESCRIPTION OF THE DRAWINGS

The features and advantages of the invention will be appreciated upon reference to the following drawings of an exemplary embodiment, in which.

DESCRIPTION OF ILLUSTRATIVE EMBODIMENTS

Figure 1:
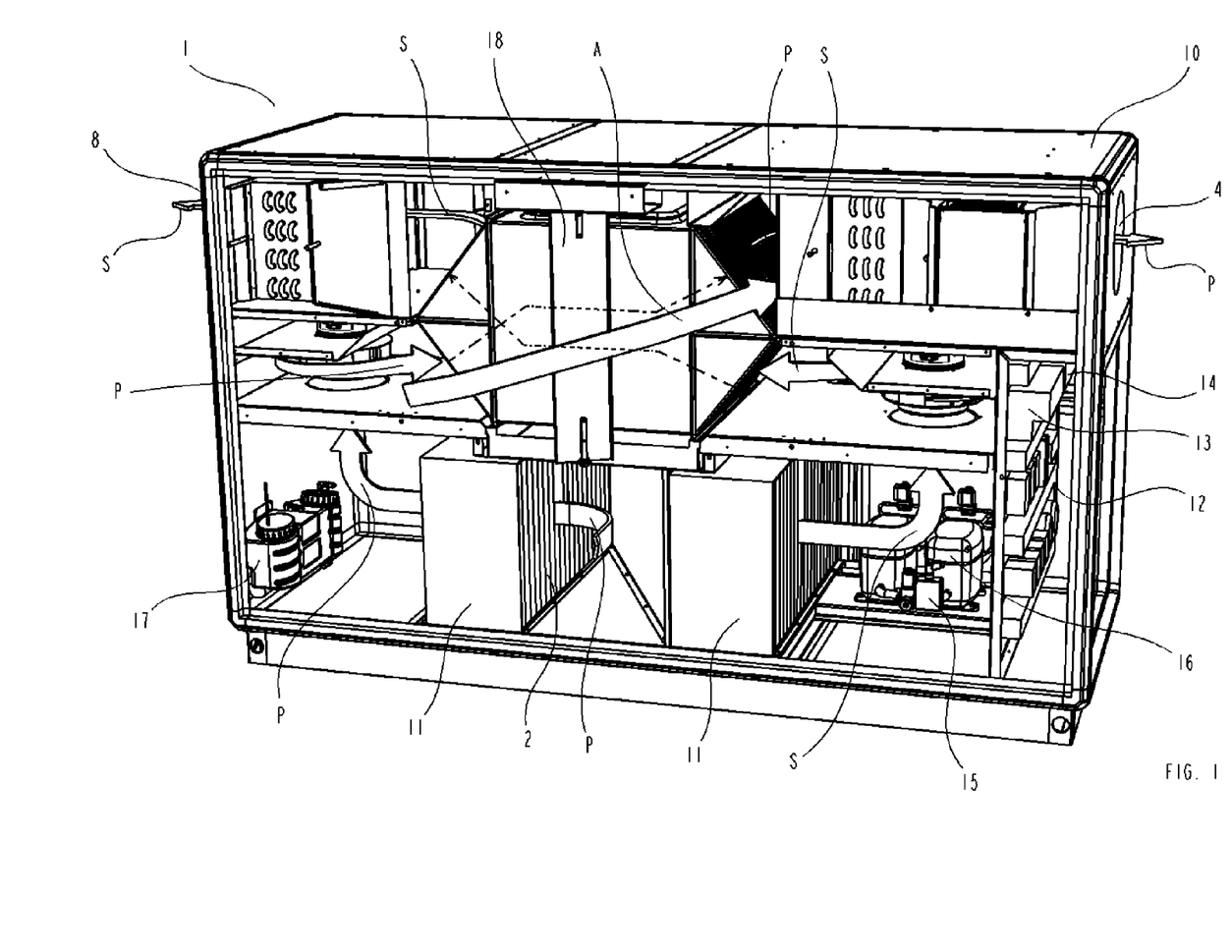
FIG. 1 is a perspective view revealing a front side of a hybrid cooling system according to the invention.
Figure 2:
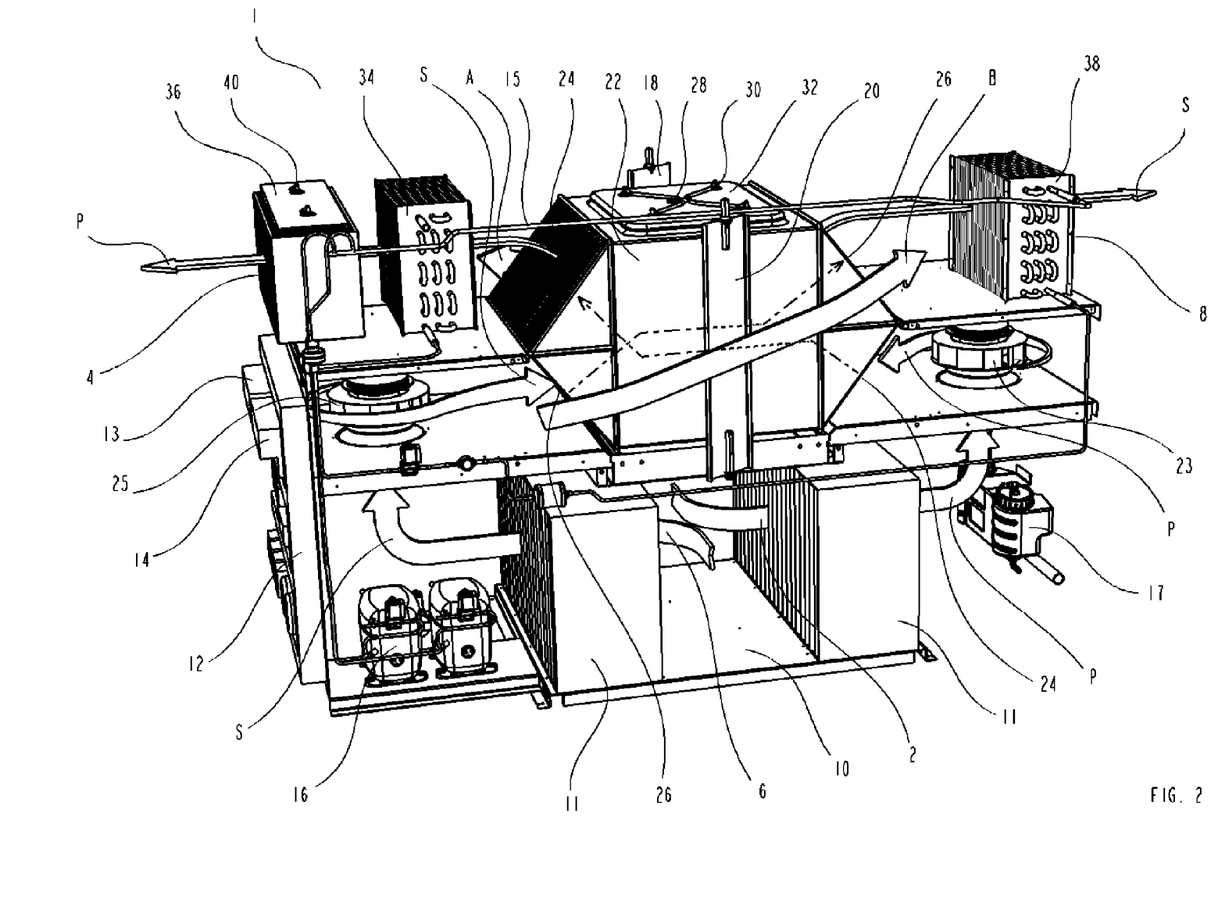
FIG. 2 is a perspective and partial view showing a back side of the hybrid cooling system of FIG. 1.

The following is a description of an embodiment of the invention, given by way of example only and with reference to the drawings. Referring to FIG. 1, there is shown a perspective view of a front side of a hybrid cooling system 1 according to the invention. FIG. 2 shows the system 1 of FIG.

1 in perspective view from the opposite side with the housing 10 and certain peripheral components removed for the sake of clarity.

The system 1 comprises a primary inlet 2, a primary outlet 4, a secondary inlet 6 (visible in FIG. 2) and a secondary outlet 8 for guiding primary (P) and secondary (S) airflows through a housing 10. The housing 10 also incorporates a number of filters 11, a controller 12 provided with a memory 13 and input/output device 14, an advanced direct expansion (DX) unit 15 including compressors 16, a water management system 17, a primary bypass deflector 18 and a secondary bypass deflector 20 (visible in FIG. 2).

At the centre of the system 1 is located indirect evaporative cooling unit 22. Evaporative cooling unit 22 is a high efficiency indirect evaporative cooler comprising primary channels 24 and secondary channels 26 operating in counter flow. A preferred design of this device is the Oxycell™ II heat exchanger, manufactured by Oxycell Holding B.V. as described in WO2007/071796 (the contents of which is hereby incorporated by reference in its entirety) and in further detail below. An alternative device is the Oxycell™ I heat exchanger, as described in WO03/091633, the contents of which is hereby incorporated by reference in its entirety. The skilled person will nevertheless be aware of the fact that any heat exchanger could be used, subject to it being capable of efficiently evaporating water or another evaporating medium from heat exchanging surfaces of its secondary channel. Alternatively, a dry heat exchanger in combination with an adiabatic cooler located upstream in the secondary channel could be used. The evaporative cooling unit 22 is provided at its upper part with a water distribution system 28, comprising sprinklers 30 and a drip tray 32 for distributing water to the secondary channels 26. The water distribution 28 system is connected to water management system 17.

Between the primary inlet 2 and the primary channels 24 of the evaporative cooling unit 22 is located a primary fan 23. A secondary fan 25 is located between the secondary inlet 6 and the secondary channels 26. Between the primary channels 24 and the primary outlet 4 are sequentially located an evaporator 34 and an adiabatic cooler 36. The adiabatic cooler 36 also has a water feed 40, which may be connected to the same water management system 17 as water distribution system 28. Between the secondary channels 26 and the secondary outlet 8 is located a condenser 38. The evaporator 34 and condenser 38 form part of the circuit of the DX unit 15.

FIG. 2 also indicates the various air flows through the system 1. Primary air flow P passes from primary inlet 2 through primary fan 23, primary channels 24, evaporator 34 and adiabatic cooler 36 and exits to a habitable space via primary outlet 4. Secondary air flow S returns from secondary inlet 6 and passes through secondary fan 25, secondary channels 26 and condenser 38 to secondary outlet 8. Additionally, operation of the bypass deflectors 18, allows the primary air flow P and secondary air flow S to pass around the evaporative cooling unit 22 as respectively primary bypass flow A and secondary bypass flow B.

Figure 3:
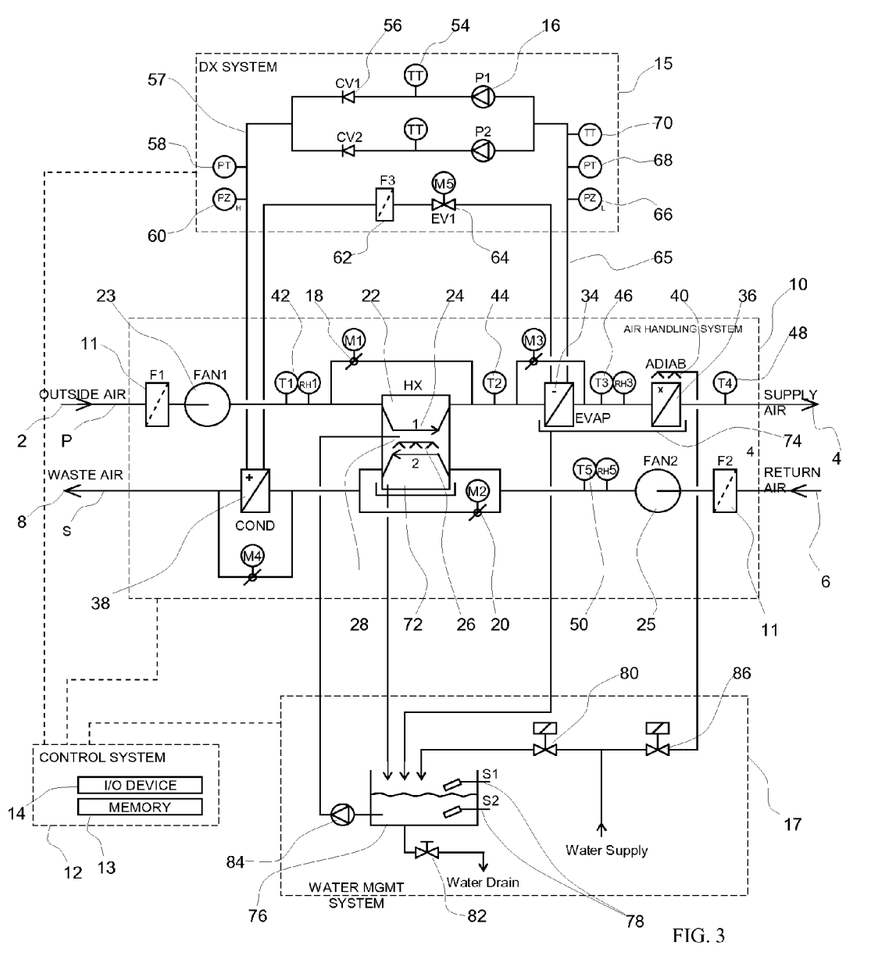
FIG. 3 shows a schematic arrangement of the hybrid cooling system of FIGS. 1 and 2.

FIG. 3 shows schematically the arrangement of the components of FIGS. 1 and 2 including the various control points within the system. With reference to FIG. 3, DX unit 15 is seen to include two compressors 16 arranged in parallel. Downstream of each compressor 16 is located a compressor temperature sensor 54 and check valve 56. In a discharge line 57 between the compressors 16 and the condenser 38 is located a discharge line pressure sensor 58 and a discharge line pressure monitor 60. Downstream of the condenser 38 are located in series a fluid filter 62, a motor-driven adjustable expansion valve 64 and evaporator 34. A suction line 65 returns from the evaporator 34 to the compressor 16 and includes a suction line pressure monitor 66, suction line pressure sensor 68 and suction line temperature sensor 70.

In operation of the DX unit 15, a cooling fluid is initially compressed by one or both of the compressors 16. It then passes compressor temperature sensors 54, check valves 56, discharge line pressure sensor 58 and discharge line pressure monitor 60, before entering the condenser 38. In the condenser, the fluid condenses, releasing latent heat to the secondary air flow S. Next, after condensation and cooling down, the cooling fluid passes filter 62 and is allowed to expand through motor-driven expansion valve 64. The cooling fluid then passes through evaporator 34 where it evaporates by heat transfer from the primary air flow P. The heated gaseous fluid enters the suction line returning towards the compressors 16 passing the suction pressure monitor 66, pressure sensor 68 and temperature sensor 70. By carefully adjusting the operation of the compressors 16 and the expansion valve 64, the pressure at discharge line pressure sensor 58 and suction line pressure sensor 68 can be regulated to control the operating temperatures of the evaporator 34 and condenser 38. As will be understood more clearly below, this is important in order to be able to efficiently operate the DX unit 15 between different operating points.

FIG. 3 also shows a number of sensors located in the air channels within the housing. An inlet sensor 42 measuring temperature T1 and relative humidity RH1 is located at the primary inlet 2. The inlet sensor 42 is placed downstream of the primary fan 23 to allow for warming of the air. An intermediate sensor 44 measuring temperature T2 is located between an exit from the primary channels 24 and the evaporator 34. An evaporator sensor 46 measuring the temperature T3 and relative humidity RH3 of the air leaving the evaporator 34 is located between the evaporator 34 and the adiabatic cooler 36. An outlet condition sensor 48 measures the temperature T4 of the air at the primary outlet 4 at a distance downstream from the adiabatic cooler 36 sufficient to ensure a relatively homogenous temperature. A secondary sensor 50 measures the temperature T5 and relative humidity RH5 of the air at entry to the secondary channels 26 of the evaporative cooling unit 22.

Adiabatic cooling unit 36 is a HumEvap MC2 humidifier available from JS Humidifiers PLC. It comprises an absorbent matrix of glass fibre and ceramic composite materials through which the air may pass. Water is distributed from water feed 40 across the top of the matrix and is picked up as water vapour by the airflow. Evaporation of vapour into the air reduces the air temperature while maintaining constant enthalpy. In general, this manner of cooling is effective to take the temperature of the air down to its wet-bulb temperature. Since, in the case of adiabatic cooling unit 36, water is introduced directly into the primary air flow P entering the habitable space, it is desirable that nebulisation is avoided in order to reduce risks of contamination. The water management system 17 also includes anti-microbial provisions (not shown) and the skilled person will be well aware of additional measures that may be taken in this respect.

Also shown in FIG. 3, are further details of the water management system 17. Beneath evaporative cooler 22 is located a first tray 72. A second tray 74 is located beneath the evaporator 34 and adiabatic cooler 36. Water collecting in either first 72 or second tray 74 can flow away to a reservoir 76. The reservoir 76 includes a level sensor 78. Water from a water supply can be added to the reservoir 76 if the level falls below level S2 by opening a fill valve 80. If the level passes above level S1, operation of a drain valve 82 allows excess water to flow to a drain. The reservoir 76 supplies water to the water distribution system 28 by operation of a water pump 84. In the embodiment shown, water is supplied to the water feed 40 of adiabatic cooler 36 directly from the mains water supply by operation of a feed valve 86. It will be understood that the water feed 40 could also be supplied from the reservoir 76.

Figure 4:
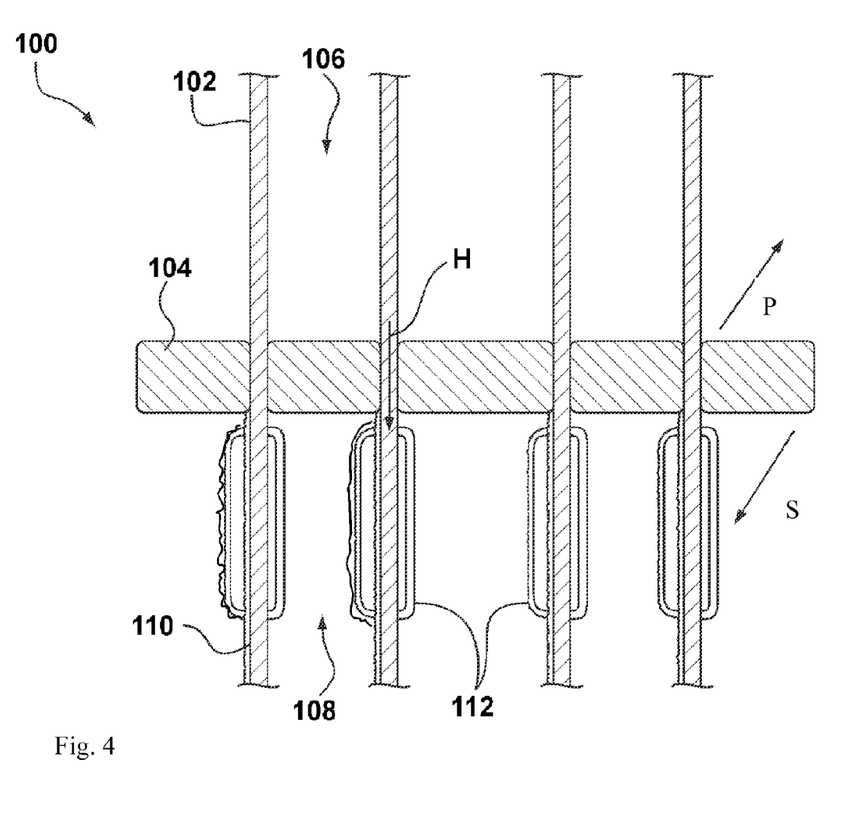
FIG. 4 shows a section of part of the indirect evaporative cooler used in the hybrid cooling system.

FIG. 4 shows a part of the evaporative cooler 22. According to FIG. 4, there are shown a number of heat conducting plates 102 arranged in spaced, generally parallel relationship. Spacing elements 104 separate the plates 102 from one another and define, together with the plates 102, primary 106 and secondary 108 passages between the plates 102. Primary 106 and secondary 108 passages together form the respective primary 24 and secondary 26 channels. The plates 102 are formed of aluminium or another suitable heat conducting material. The plates 102 are provided in the region of the secondary channels 108 with a water retaining layer 110 on one of their surfaces. Louvres 112 are provided through the plates 102 in the region of the secondary channels 108. The spacing elements 104 are formed of a form-stable resin material.

In operation of the evaporative cooler, water or another evaporable liquid is supplied to the water retaining layer 110 by the water distribution system 28. As the secondary air flow S passes over the water retaining layer 110, it takes up water by evaporation. The louvres 112 direct the air through the plate 102 where it is then warmed by direct heat transfer from the surface of the plate 102. Primary air P flowing through the primary channels 106 in counter flow to the secondary flow is cooled by direct heat transfer to the plate 102. The heat transferred to the plate 102 in the region of the primary channel is conducted within the plate 102 according to arrow H to the region of the secondary channel 108. Water is supplied by the water distribution system 28 in an intermittent manner. In general this has been found preferable, since during watering, the secondary air flow S may become saturated with moisture, reducing heat transfer from the surface of the plate 102. Once the water has been taken up by the water retaining layer 110, evaporation can take place from the plate 102 and lower temperatures are achieved.

The skilled person will be well aware of alternative arrangements providing evaporative cooling that may replace the above described module. Furthermore, although the arrangement is shown in simple counter-flow operation between primary and secondary streams, other circuits and arrangements may be substituted including the dewpoint cooler arrangement known from WO03/091633 and those arrangements known from and described in WO 2007/080162, the contents of which are included herein by reference in their entirety.

Further operation of the system 1 will now be described with reference to FIGS. 5-7, which show enthalpy/humidity diagrams of the regions of proposed operation of the system 1. In the present embodiment, the device will be described for operation at a set point for the outlet air 15.5° C. and 97% RH. The skilled person will immediately understand that this value is merely exemplary and that other set points may be chosen. It will also be understood that the set point may be allowed to vary in order to maximize the COP of the unit for any given operating condition. According to FIGS. 5-7 the enthalpy/humidity diagrams are subdivided into three zones or regions of operation. A first zone I is defined by the line of constant temperature corresponding to the set point at 15.5° C. and by the line of constant enthalpy passing through the set point. A second zone II is defined between the lines of constant enthalpy and constant absolute humidity that both pass through the set point. A third zone III corresponds to the region bounded by the line of absolute humidity passing through the set point and by the saturation line. For practical purposes, both zones II and III are in fact also limited at their lower extent by the temperature 16.4° C. and the enthalpy line of 43.5 KJ/Kg passing through 16.4° C. and the set-point. This region represents the minimum mechanical cooling capacity available from the DX unit 15, which is about 1° C. Clearly, for a device having still finer regulation, the zones could extend all the way to the set-point.

Figure 5:
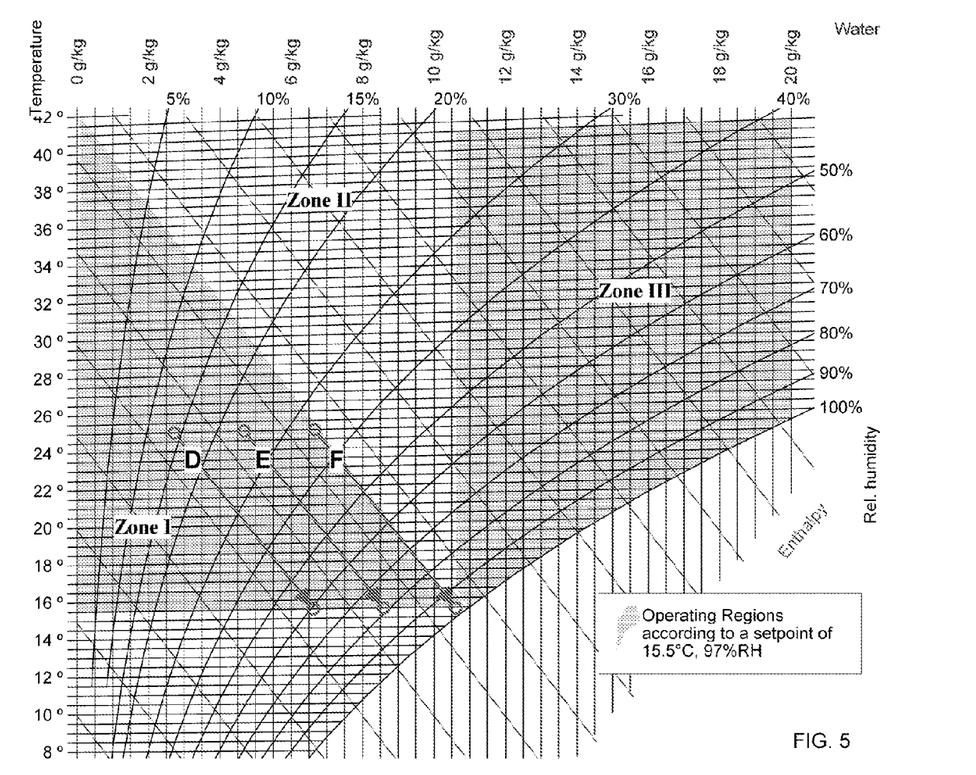
FIGS. 5 to 7 show enthalpy/humidity diagrams indicating operation of the system according to the invention in different regions of operation.

FIG. 5 shows options D, E, and F for cooling within zone I. On switching on the system 1, air is initially circulated by inlet fan 23. The temperature and humidity of the inlet air T1, RH1 as detected by inlet sensor 42 is registered by the controller 12 as lying in the zone I. DX unit 15 and the water supply to the sprinklers 30 is switched off and the bypass deflectors 18 and 20 are opened to allow air to bypass the primary and secondary channels 24, 26. Bypass of the indirect evaporative cooler 22 reduces the overall pressure drop across the system and leads to a reduction in power input to fans 23, 25. Bypassing the evaporator 34 and/or condenser 38 may reduce the power input even more for those cases where DX cooling is not required. In that case, additional bypass facilities (not shown) may be provided to achieve this. Controller 12 determines the amount of additional moisture that must be added to the air by supply to the water feed 40 of adiabatic cooler 36 in order to reduce its temperature to the set-point of 15.5° C. Line F represents an inlet temperature of 25° C. and 34% RH. Addition of water at 4 g/Kg to the air will reduce the temperature to the set point. For dryer air at 24% RH and 14% RH respectively, addition of a similar amount of moisture via adiabatic cooler 36, will reduce the temperature to 15.5° C. but will not achieve the set point. In the case of line D, the final humidity is 60.5% RH, while in the case of line E, 78.5% RH is achieved. As a lower humidity than required is generally acceptable, the air is output to the habitable space through primary outlet 4.

Figure 6:
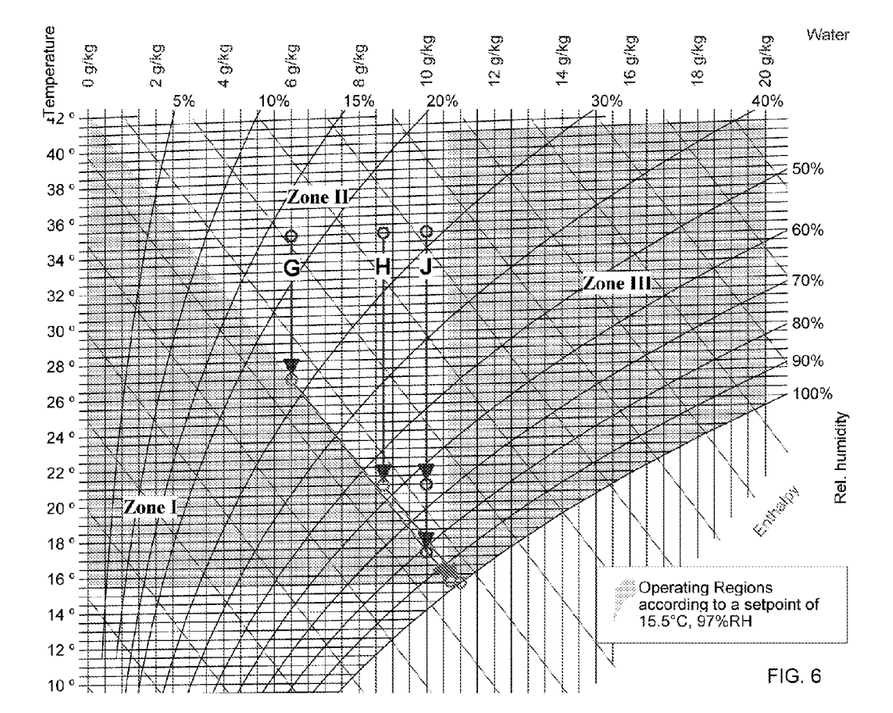

FIG. 6 shows three examples G, H, I, of cooling within zone II. The temperature and humidity of the inlet air T1, RH1 as detected by inlet sensor 42 is registered by the controller 12 as lying in the zone II. DX unit 15 remains switched off. At the inlet to the secondary channels, the air condition T5, RH5 registered by secondary sensor is used to determine the wet-bulb temperature of the secondary air S at this point. Since the evaporative cooler 22 can only cool the primary air to the wet-bulb temperature of the secondary air, the inlet temperature T1 needs to be higher than this value before cooling with the evaporative cooler is effective. If it is determined that this is the case the water supply to the sprinklers 30 is switched on and the bypass deflectors 18 and 20 are initially closed to direct air through the primary and secondary channels 24, 26. In this zone, the manner in which cooling takes place can vary according to the inlet and outlet air condition. In the case of line G, inlet air is relatively dry. Operation of the evaporative cooler 22 can easily bring the temperature of the air from its initial condition of 35° C. to the enthalpy line of 42.5 KJ/Kg. From this point, addition of moisture by water feed 40 can take the air to the set-point. Since the total capacity of the evaporative cooler 22 is not required, the bypass deflectors 18, 20 are partially opened to allow a regulated amount of air to through the primary and secondary channels 24, 26. The controller 12 also controls the water supply to the water feed 40 by adjusting feed valve 86 to achieve the desired cooling. In the case of line H, the inlet air is initially at 35° C. and 25% RH. The primary and secondary bypass deflectors 18, 20 are fully closed and water is supplied to achieve the maximum cooling capacity of the evaporative cooler 22. Further cooling by the adiabatic cooler 36 brings the outlet air to the set point. This is the limit of operation without additional cooling capacity from other cooling sources. In the case of line J, the evaporative cooler 22 is again operated at maximum capacity with primary and secondary bypass deflectors 18, 20 fully closed. At exit to the evaporative cooler, the intermediate sensor 44 registers the temperature T2 and determines the degree of cooling required from DX unit 15, which is operated to bring the air to the enthalpy line of 42.5 KJ/Kg. From this point, addition of water via feed 40 to adiabatic cooler 36 brings the outlet air to the desired set-point. It may be noted that line H in fact terminates slightly above the set point enthalpy. Operation of the DX unit 15 at its minimum output of 10% of full power would cause the temperature to go below the set point which would be an undesirable waste of energy. In this case, the controller 12 is consciously set to allow a slight over-temperature at output.

Figure 7:
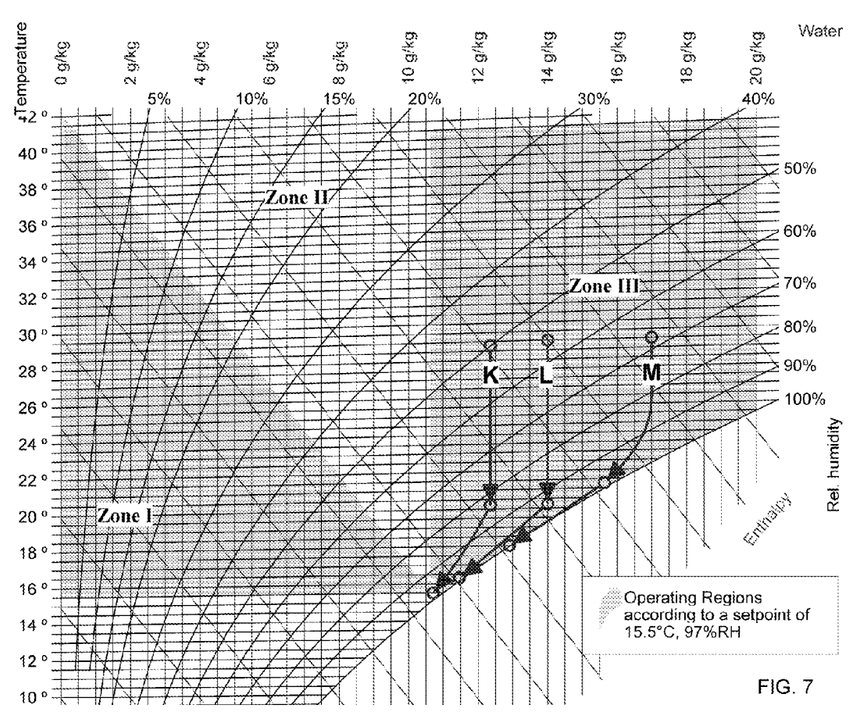

FIG. 7 shows a further series of operational conditions K, L, M lying within zone III. Line K commences from the design point of the unit on which the maximum performance of the DX unit 15 is based (inlet conditions 28.8° C. en 50% RH). The evaporative cooler 22 is operated to cool the air to its maximum possible capacity. Thereafter, the DX unit 15 is operated to further cool and dry the air to reach the set point. Beyond the design point, according to line L, air at 29° C. and 56% humidity is cooled by the evaporative cooler 22 to its maximum capacity. Thereafter, operation of the DX unit 15 on full load causes primarily condensation of the air. The final temperature achieved lies slightly above the set point at around 16° C. In case of line M, operation of the evaporative cooler 22 already leads to cooling below the dew point of the inlet air and condensation may take place in the primary channels 24. Operation of the DX unit 15 on full load causes condensation of the air to a final temperature above the set point at around 18° C. Thus, the invention has been described by reference to the embodiment and operating conditions discussed above. It will be recognized that this embodiment is susceptible to various modifications and alternative forms well known to those of skill in the art without departing from the spirit and scope of the invention as defined by the appended claims.

What is claimed is:

1. A heat exchange system for supplying air to a habitable space at a desired output condition comprising:
   a continuously variable mechanical cooler;
   an indirect evaporative cooler comprising primary and secondary channels;
   an adiabatic cooler; and
   a controller arranged to selectively supplement a cooling capacity of the indirect evaporative cooler or the adiabatic cooler or both the adiabatic and indirect evaporative cooler, with a variable amount of cooling from the mechanical cooler in order to reach the desired output condition.

2. The system of claim 1, wherein the mechanical cooler is an advanced direct expansion cooling unit.

3. The system according to claim 1, wherein the indirect evaporative cooler comprises heat conducting projections extending into the primary and secondary channels, the heat conducting projections in the primary channel being in heat conducting relation with the heat conducting projections in the secondary channel.

4. The system according to claim 1, wherein, in no particular order, the indirect evaporative cooler, adiabatic cooler and mechanical cooler are provided in series.

5. The system according to claim 1, wherein the coolers are provided in series in a downstream order with respect to the primary flow, of indirect evaporative cooler, mechanical cooler and then adiabatic cooler.

6. The system according to claim 1, further comprising a water distribution system arranged to supply water intermittently to the secondary channel during operation of the indirect evaporative cooler.

7. The system according to claim 1, further comprising a sensor adapted to be responsive to input air conditions to provide an input condition signal to the controller.

8. The system according to claim 7, further comprising an intermediate sensor arrangement for determining at least the temperature of the air at an outlet from the primary channels of the indirect evaporative cooler.

9. The system according to claim 7, wherein the control unit comprises a memory including data defining operating ranges of the coolers and wherein the controller is adapted to determine a region of operation on the basis of the input condition signal and control the operation of the coolers according to the region of operation.

10. The system according to claim 7, wherein the control unit comprises information regarding three zones of operation and is responsive to the input condition signal to:
    operate only the adiabatic cooler if the input condition is within a first zone;
    operate the evaporative cooler and at least the adiabatic cooler if the input signal is in a second zone; and
    operate the evaporative cooler and at least the mechanical cooler if the input signal is in the third zone.

11. The system according to claim 10, wherein the system selects the adiabatic cooler if the inlet air is in the second zone and selects the mechanical cooler if the inlet air is in the third zone, in response to the temperature of the air at the outlet from the indirect evaporative cooler.

12. The system according to claim 1, wherein the desired output condition comprises a predetermined output set-point of temperature and humidity.

13. The system according to claim 1, further comprising a return air channel for supplying air from the habitable space to the secondary channel of the indirect evaporative cooler.

14. The system according to claim 1, further comprising a secondary sensor arrangement for determining a condition of an air supply to the secondary channel of the indirect evaporative cooler.

15. The system according to claim 1, wherein the indirect evaporative cooler comprises a bypass of the primary and/or the secondary channel and the control unit is operable to control flow through the bypass to regulate the cooling capacity of the indirect evaporative cooler.

16. A method of operating a cooling system to supply air from an external source to a habitable space at a preset condition, the system comprising a continuously variable mechanical cooler operable to selectively provide variable amounts of cooling output, an adiabatic cooler, an indirect evaporative cooler and a controller for controlling operation of the system, the method comprising:
    determining operating ranges of the coolers;
    determining an inlet condition of the air from the external source;
    optionally operating the adiabatic or indirect evaporative cooler to cool the air if the inlet condition lies within the operating range of the adiabatic cooler or indirect evaporative cooler;
    effecting a variable amount of cooling output from the mechanical cooler to complement the cooling of the adiabatic cooler or evaporative cooler; and
    supplying the air to the habitable space at the preset condition.

17. The method according to claim 16, wherein the evaporative cooler comprises a plurality of distinct cooling modules and the method comprises selectively combining cooling capacity from the cooling modules to achieve the available capacity of the indirect evaporative cooler.

18. The method of claim 16, wherein the mechanical cooler is an advanced direct expansion cooling unit.

19. The method according to claim 16, wherein the controller comprises a memory including data defining regions based on the operating ranges and wherein the controller determines a region of operation on the basis of the input condition signal and controls the operation of the cooling units according to the region of operation.

20. The method according to claim 16, wherein the indirect evaporative cooler comprises a bypass and the method comprises controlling flow through the bypass to control the cooling output of the indirect evaporative cooler.

* * * * *